Jan. 1, 1929.
P. MacGAHAN
WAVE METER
Filed Oct. 5, 1923
1,697,196
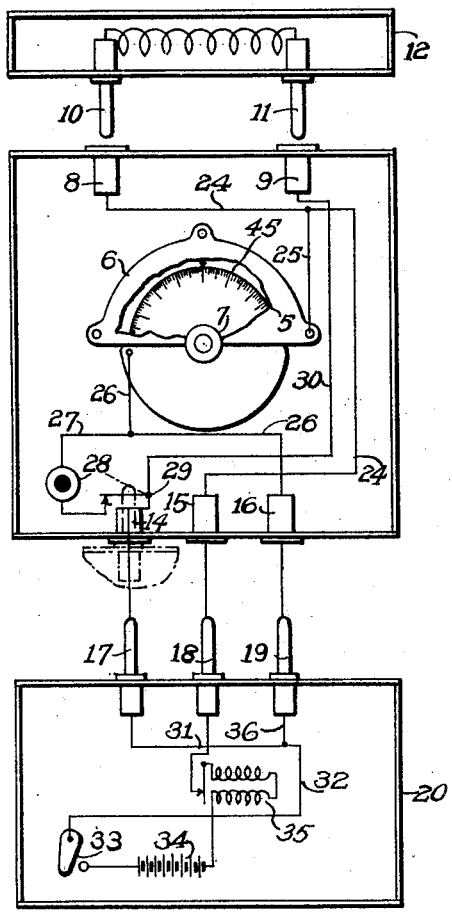
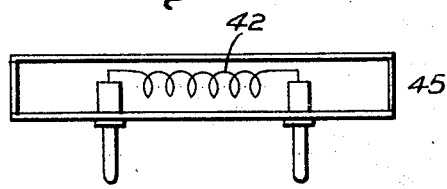
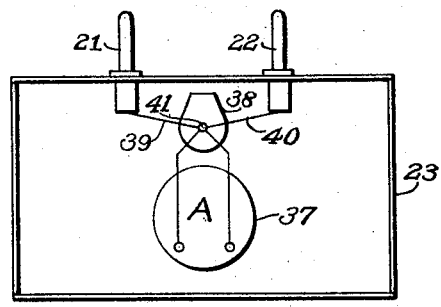
INVENTOR
Paul MacGahan.

Patented Jan. 1, 1929.

1,697,196

UNITED STATES PATENT OFFICE.

PAUL MacGAHAN, OF PITTSBURGH, PENNSYLVANIA, ASSIGNOR TO WESTINGHOUSE ELECTRIC & MANUFACTURING COMPANY, A CORPORATION OF PENNSYLVANIA.

WAVE METER.

Application filed October 5, 1923. Serial No. 666,705.

This invention relates to wave meters.

It is an object of this invention to provide a wave meter which shall be so arranged to serve for a number of mutually supplementary ranges of wave lengths that its total capacity will cover a greater range than has heretofore been practical with a single instrument.

It is another object of this invention to provide a set of inductors of different sizes which may be interchangeably connected with another part of the wave-meter circuit, whereby the instrument can be used for different ranges of wave lengths by changing the inductor.

It is also an object of this invention to arrange a wave meter in a number of small convenient cases provided with separable connecting devices, whereby the several arrangements of the wave meter for different uses may be made by merely taking away one case and replacing it by another.

It is a further object of this invention to provide a wave meter in which a comparatively small continuously adjustable part may be made to provide for as great a range of wave lengths as has heretofore been covered by using a very large continuously adjustable element. It is a further object of this invention to provide a wave meter with interchangeable indicating devices, one of which will conveniently indicate when the maximum current is obtained and the other of which has a scale so that the instrument may be used as a decremeter.

It is a further object of this invention to provide a switch for removing the indicating means from the circuit, when the arrangement of the wave meter is one which requires its removal, and to provide for operating this switch by the act of making the said arrangement.

It is a further object of this invention to provide an exciting device for use with the wave-meter circuit when it is to act as a source of oscillations and to so arrange the connections for this exciting device that the act of placing the device in operative position will establish the necessary connections.

Other objects and details of the invention will be apparent upon the inspection of the drawings and reading the following description.

On the drawing, Figure 1 is a view, partly diagrammatic, of the several parts of the instrument in their separated relation.

Fig. 2 is a partly diagrammatic view showing a part which may be substituted for the upper part of Fig. 1.

Fig. 3 is a similar view showing a part which may be substituted for the lower part of Fig. 1.

The central part of Fig. 1 shows a casing 5 which contains a condenser 6. This condenser is adjustable, the adjustment being performed by means of a knob 7 which extends outside of the casing. At the upper side of the casing, there are a pair of sockets 8 and 9 which are intended to co-operate with a pair of plugs 10 and 11 secured to the lower wall of the casing 12. The casing 12 contains an inductance coil 13, the terminals of which are connected to the plugs 10 and 11.

The lower wall of the casing 5 has three sockets 14, 15 and 16 secured therein. These sockets are properly spaced and are of the proper size to receive the plugs 17, 18 and 19, which plugs are secured to the upper wall of the casing 20. The sockets 14 and 16 will also fit the plugs 21 and 22 which are mounted on the upper wall of the casing 23.

The connections within the casing 5 include a conductor 24 from the socket 8 to the socket 15. A branch wire 25 connects the conductor 24 to one element of the condenser 6. The other element of the condenser is connected by a conductor 26 to the socket 16. From the conductor 26, a branch conductor 27 goes to the lamp 28. The other terminal of this lamp is connected through a switch 29 to the socket 14. The switch is connected by a conductor 30 to the socket 9.

The connections within the casing 20 include a conductor 31 for connecting the plugs 17 and 19. This conductor is also connected by a conductor 32, through a switch 33 to the battery 34. The other end of this battery is connected to the winding of the buzzer 35. The back contact of this buzzer is connected by conductor 36 to the middle plug 18.

The apparatus in the casing 23 includes a meter 37. Upon the drawing, this meter has been indicated as an ammeter. If desired, it may be provided with a scale reading directly in current, but preferably it is provided with a scale giving the square of the current in order that it may be used in measuring decrements. The casing 23 also contains a vacuum bulb 38 within which there is a thermocouple, connected to the terminals of the meter 37. This thermocouple is heated by a resistance element, which is connected by conductors 39 and 40 to the plugs 21 and 22. The heating element and the thermocouple are preferably embedded in a small ball 41 of solder, or of other metal, for preventing their relative movement and for affording good thermal conduction between them.

When the casing 12 is united to the casing 5 by inserting the plugs 10 and 11 in the sockets 8 and 9, a circuit is established from the right-hand end of the inductance coil 13 through the plug 11, socket 9, conductor 30, switch 29, lamp 28, conductors 27 and 26 to one element of the condenser 6, and from the other element of the condenser through wires 25 and 24, socket 8 and plug 10 to the left hand end of the inductance coil 13. It will, therefore, be seen that this circuit includes in series, an inductor, a condenser and a lamp. When this circuit is subjected to an alternating field, it will offer only a small impedance, provided the frequency of the field is that for which this circuit is resonant, and for other frequencies, this circuit will present a large impedance. By adjusting the condenser by means of the knob 7 until the lamp 28 has maximum brightness, the frequency of the field may be determined. For this reason, the knob 7 is preferably provided with a dial 45, which may be graduated in wave lengths. For certain purposes, however, it is convenient to have this scale graduated to give decrements directly.

The range of the instrument arranged in this way is limited by the extreme values of the capacity. When it is desired to measure wave lengthes beyond this range, the casing 12 is removed and the casing 45, illustrated in Fig. 2, is put in its place. This casing is similar in all respects to casing 12 except that the inductance coil 42 therein is of a different size from inductance coil 13. If a larger inductance is substituted for the inductance coil 13, this change will arrange the instrument for longer wave lengths; if a smaller inductance is so substituted, the arrangement serves for shorter wave lengths.

When it is desired to use the instrument, not merely as a wave meter but as a decrementer, the casing 23 is attached to the bottom of the casing 5 by inserting the plugs 21 and 22 in the sockets 14 and 16. The insertion of a plug into the socket 14 opens the switch 29. A resonant circuit is now established, going from the right-hand side of the inductor 13 through the plug 11, socket 9, conductor 30, socket 14, plug 21, conductor 39, resistance element, conductor 40, plug 22, socket 16, conductor 26, condenser 6, conductors 25 and 24, socket 8, and plug 10, to the left-hand end of the inductor 13. This circuit may be used to measure the wave length of the field in the same way as the circuit above described, except that, instead of watching for the maximum brightness of the lamp 28, the observer now looks for the maximum reading of the meter 37. The lamp 28 now remains dark because the switch 29 is open. The range of the instrument may be changed, as described, before by substituting other inductors for the inductor 13. When it is desired to determine the decrement, the condenser 6 is adjusted by turning the knob 7 until the reading on instrument 37 is halved, as is usual in making such measurements.

When the instrument is to be used as a source of waves, instead of as a measure for them, the casing 23 is removed from the lower end of the casing 5 and the casing 20 put in its place. The plug 17, entering the socket 14, opens the switch 29 in the same way that the plug 21 opened it. The circuit which is now established goes from the right-hand end of the coil 13 to the socket 14 over the path already described and then through plug 17, conductor 31 and plug 19 to socket 16. From socket 16, the circuit goes to the left-hand end of the coil 13 over the path already described. There is now, however, a shunt circuit to the oscillating circuit. This shunt circuit extends from the conductor 31, over the conductor 32, switch 33, through battery 34, buzzer 35 and to the plug 18, from the plug 18 it goes to the socket 15 and so joins the previously described circuit at the conductor 24. When the switch 33 is closed, the battery 34 operates the buzzer 35 and so impresses an intermittent potential at two points in the oscillating circuit. On one side, these points are separated by the condenser 6 and on the other side by the inductor 13. When the buzzer opens the shunt, the circuit including the inductor and the condenser remains intact and undisturbed by the shunt. It is, therefore, free to oscillate at its natural period. By properly adjusting the condenser, this natural period may be fixed at any desired value. If the desired value is beyond the range of the instrument with the inductor 13, other inductors may be substituted in the way already described.

Although I have illustrated but one form of my invention, it will be evident to those skilled in the art that other forms may be used and that the details of construction may be varied through a wide range without departing from the spirit of this invention. I, therefore, do not wish my invention to be limited except as is required by the prior art or indicated in the following claims.

I claim as my invention:

1. In a wave meter, a casing, an indicating device associated therewith, a second casing, a substitute indicating device therein, an oscillating circuit including an element in said first-named casing, separable connectors, each including a member mounted on said first-named casing and connected to an appropriate point in the circuit, a third casing, a buzzer and battery therein, said third casing having members of said separable connectors mounted thereon and connected to appropriate points of the buzzer and the battery, whereby, on joining the separable connectors, the buzzer and battery will excite the oscillating circuit, connector members mounted on said second casing and appropriately connected to the substitute indicating device, said last-named connector members being adapted to co-operate with certain of the connector members on the first named casing, whereby upon removal of the third casing the substitute indicating device may be inserted in the oscillating circuit.

2. In a wave meter, a casing, an indicating device associated therewith, a second casing, a substitute indicating device therein, an oscillating circuit including a lamp and a switch located in said first-named casing, a plurality of separable connectors each including a member mounted on said first-named casing and connected to an appropriate point in the circuit, a third casing, a buzzer and battery therein, said third casing having members of said separable connectors mounted thereon and connected to appropriate points of the buzzer and battery, the switch being located to be opened by the joining of one of said separable connectors, whereby, on joining the separable connections, the indicating device will be disconnected from the oscillating circuit and the buzzer and battery will excite the oscillating circuit, connector members mounted on said second casing and appropriately connected to the substitute indicating device, said last-named connector members being adapted to co-operate with certain of the connector members on the first named casing, whereby upon removal of the third casing the substitute indicating device may be connected to the oscillating circuit instead of the first-named indicating device.

In testimony whereof, I have hereunto subscribed my name this 28th day of September, 1923.

PAUL MacGAHAN.